INVENTOR.
HUGH K. SCHILLING
BY
Carlsen, Carlsen, Sturm & Nicks
ATTORNEYS

United States Patent Office 3,497,046
Patented Feb. 24, 1970

3,497,046
ROTARY SEAL FOR CLUTCH AND BRAKE
MEMBERS HAVING RELATIVE ROTATION
AND RECIPROCATION
Hugh K. Schilling, St. Paul, Minn., assignor to Horton
Manufacturing Company, Inc., Minneapolis, Minn., a
corporation of Minnesota
Filed Sept. 27, 1967, Ser. No. 670,935
Int. Cl. F16d 25/00, 11/04
U.S. Cl. 192—85                                   2 Claims

ABSTRACT OF THE DISCLOSURE

The disclosure includes two relatively rotating and reciprocable parts as in a clutch, brake or the like with an annular member fixedly and coaxially carried by and extending from one of the parts with the other part formed with an annular recess into which the annular member slidably and rotatably fits with relatively close tolerances.

SUMMARY OF THE INVENTION

The invention relates to a rotary seal for two members of a clutch, brake or the like having relative rotation and reciprocation. It is an object of the invention to provide an annular member fixed to one of two members between which there is relative rotation and which extends axially therefrom. The remaining member is formed with an annular recess into which the annular member extends for free rotation and slidable axial movement therein. The annular member prevents foreign material such as friction lining material in a brake or clutch from traveling inwardly of the annular member to a point where the sliding movement of a clutch or brake disc is effected. The annular member also prevents foreign material such as bearing grease from traveling outwardly of the annular member to, for example, a friction ring of a clutch where it will impair its efficiency.

These and other more detailed and specific objects will be disclosed in the course of the following specification, reference being had to the accompanying drawings, in which.

Figure 1:
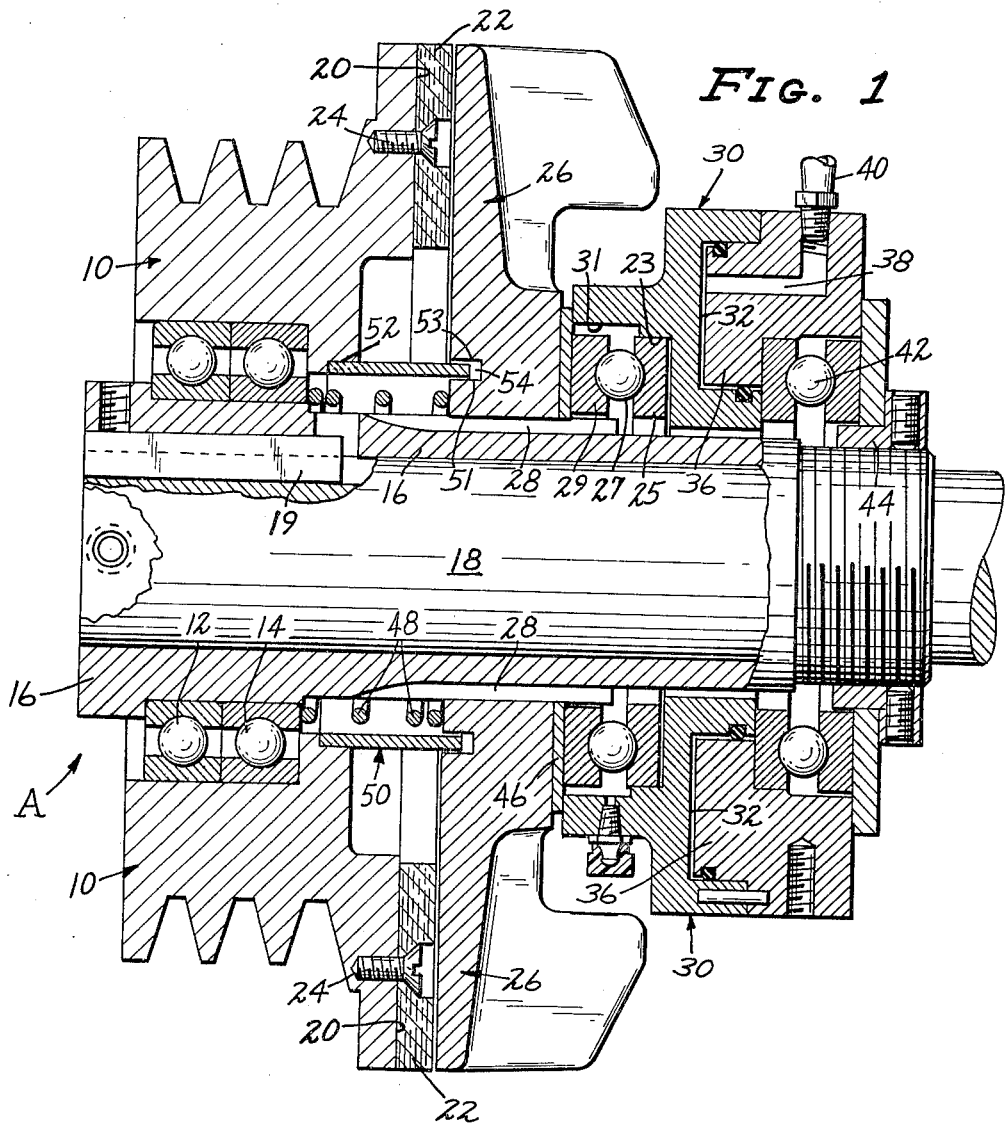
FIG. 1 is a longitudinal sectional view of a clutch embodying the invention.
Figure 2:
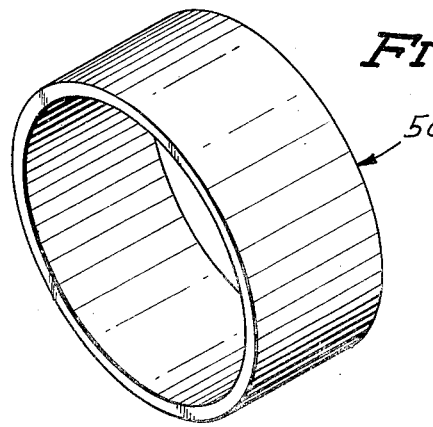
FIG. 2 is a perspective view of the annular member removed from the clutch of FIG. 1.

Referring to the drawings in detail, the rotary retainer seal A for rotating clutch and brake members and the like includes the driven rotatable sheave 10 mounted on the bearings 12 and 14 secured to the hub 16. The hub 16 is keyed to the shaft 18 by means of the key 19. The face 20 of the sheave 10 is normal to the longitudinal axis of the hub 16, and secured to the sheave face 20 is the flat friction ring 22 by means of the bolts 24.

The numeral 26 designates a clutch disc which is slidably mounted on the hub 16 by means of the splines 28. The sheave 10 is driven by belts connected to a source of power such as an engine or motor and rotates freely upon the hub 16 by means of the bearings 12 and 14. Further provided is the cylinder body 30 which has formed therein the annular cylinder 32. The cylinder body 30 is also formed with the first annular recess 23 in which the race 25 of bearing 27 is mounted with a light press fit. The remaining race 29 of bearing 27 is slidable on the splines 28 and is positioned within the second recess 31 also formed in the cylinder body 30.

Mounted within the annular cylinder 32 is the annular piston 36 and formed in the annular piston 36 is the air conduit 38 which leads to a supply line 40. The piston 36 is mounted on the bearing 42 mounted on the retainer member 44. With the introduction of air pressure into the conduit 38 the air pressure in cylinder 32 causes the cylinder body 30 to move axially upon the hub 16 against the ring 46 interposed between the cylinder body, and the clutch disc 26 is brought into engagement with the friction ring 22 thereby causing the shaft 48 to rotate through the clutch disc 26.

The clutch disc 26 and the sheave 10 have relative rotation, and the shaft 48 may be the driving member instead of the driven member as shown and the sheave 10 caused to be rotated. The coil spring 48 normally urges the clutch disc 26 out of engagement with the friction ring 22 on sheave 10.

Further provided is the annular retainer member 50 which has a hollow cylindrical formation. The body of sheave 10 is formed with an annular recessed shoulder 52 which is spaced axially from the hub 16 and against which the annular retainer member 50 is press fit. The clutch disc 26 is formed with the spaced annular shoulders 51 and 53 which form the annular recess 54, the central diameter of the recess 54 being the same as that of the annular retainer 50. The annular retainer 50 does not contact the walls 51 and 53 of recess 54 but the same moves axially and reciprocably between the walls 51 and 53 and within the recess 54. The width of the recess 54 between the shoulders 51 and 53 is only slightly larger than the radial thickness of the annular retainer 50, and it has been found that a close tolerance of approximately .005 of an inch between the outer surface of the retainer 50 and the outer surface or shoulder 53 of the recess 54 and a like tolerance of .005 of an inch between the inner surface of the retainer 50 and the inner shoulder 51 of the recess 54 produces excellent results. The result is that a current of air is set up between the surfaces of the annular retainer and the shoulder surfaces of the recess 54 when there is relative rotation between the parts thereby providing an air seal between the member 50 and the shoulders 51 and 53 of recess 54 of the clutch disc. This air seal prevents minute portions of the friction ring 22 due to wear thereof from passing to and upon the splines 28 and causing the same to bind whereby slidable motion of the clutch disc is effected. It further prevents grease from working from the bearings 12, 14 and 34 outwardly to the friction disc 22 where it defeats the purpose of the disc 22.

The axial length of the annular member 50 and the recess 54 is such that the member 50 is always extended within the recess 54 regardless of the slidable position of the clutch disc 26. The annular retainer 50 and the companion recess 54 may be used on relatively rotating parts where a seal is desired. A construction may also be effected with the annular member 50 carried by the clutch disc 26 and the annular recess 54 formed in the body of the sheave 10.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A clutch having a shaft, a sheave rotatably mounted on said shaft, said sheave having friction means secured thereto, a clutch disc slidable on said shaft, means for slidably moving said clutch disc on said shaft for engagement with said friction means of said sheave, comprising in combination:

(a) an annular member secured to said sheave concentric with said shaft, (b) said clutch disc having an annular recess formed therein, (c) said annular member extending into said annular recess to prevent the passing of material from a point outwardly of said annular member to a point inwardly thereof and from a point inwardly of said annular member to a point outwardly thereof.

2. The device of claim 1 in which the tolerance between the outer and inner surfaces of the annular member and the annular recess is approximately .005 of an inch in each instance thereby providing an air seal between the annular member and the recess.

References Cited

UNITED STATES PATENTS

| 1,672,013 | 6/1928 | Vroom | 277—57 X |
| 2,396,319 | 3/1946 | Edwards et al. | 277—53 X |
| 3,202,252 | 8/1965 | Schilling. | |

SAMUEL ROTHBERG, Primary Examiner

U.S. Cl. X.R.

192—110; 277—54, 57